United States Patent [19]

Boulin et al.

[11] 3,877,054

[45] Apr. 8, 1975

[54] SEMICONDUCTOR MEMORY APPARATUS WITH A MULTILAYER INSULATOR CONTACTING THE SEMICONDUCTOR

[75] Inventors: David McElroy Boulin, Randolph Township, County of Morris; Dawon Kahng, Bridgewater Township, County of Somerset; Joseph Raymond Ligenza, Califon; William Joseph Sundburg, Warren, all of N.J.

[73] Assignee: Bell Telephone Laboratories, Incorporated, Murray Hill, N.J.

[22] Filed: Nov. 8, 1973

[21] Appl. No.: 413,865

Related U.S. Application Data

[63] Continuation-in-part of Ser. No. 336,916, March 1, 1973, abandoned.

[52] U.S. Cl. ........................ 357/23; 357/24; 357/54

[51] Int. Cl. ........................ H01l 11/00; H01l 15/00

[58] Field of Search ........................ 317/235 B

[56] References Cited

UNITED STATES PATENTS

| | | | |
|---|---|---|---|
| 3,500,142 | 3/1970 | Kahng | 317/235 G |
| 3,604,988 | 9/1971 | Kahng | 317/235 AZ |
| 3,649,884 | 3/1972 | Haneta | 317/235 |
| 3,805,130 | 4/1974 | Yamazaki | 317/235 |

FOREIGN PATENTS OR APPLICATIONS

| | | | |
|---|---|---|---|
| 2,111,866 | 9/1972 | France | 317/235 |

OTHER PUBLICATIONS

*Applied Physics Letters* "Charge Storage on Small Metal Particles" by Labbrewitz et al.; April 71, pages, 267 to 269.

*Primary Examiner*—Andrew J. James

*Attorney, Agent, or Firm*—David I. Caplan

[57] ABSTRACT

An $SI_1I_2M$ (semiconductor-insulator$_1$-insulator$_2$-metal) memory structure is characterized by the presence of an impurity, such as tungsten, concentrated in a region including the interface ("$I_1I_2$") between the $I_1$ and $I_2$ layers. This metallic impurity provides a well-defined $I_1I_2$ interface region, including a potential minimum ("well"), such that the $I_1I_2$ interface can be filled with electronic charge carriers (electrons or holes) which have been transported from the semiconductor under the influence of electric fields applied across the structure. The presence versus absence of captured electronic charge carriers at the $I_1I_2$ interface can be used as a memory indicator.

21 Claims, 2 Drawing Figures

SEMICONDUCTOR MEMORY APPARATUS WITH A MULTILAYER INSULATOR CONTACTING THE SEMICONDUCTOR

CROSS REFERENCE TO RELATED APPLICATION

This application is a continuation-in-part of our copending application, Ser. No. 336,916, filed Mar. 1, 1973, now abandoned.

FIELD OF THE INVENTION

This invention relates to semiconductor menory apparatus, and more particularly those semiconductor memory devices in which the semiconductor is contacted by a multilayer insulator.

BACKGROUND OF THE INVENTION

In computers and electronic communication systems, there is a need for electronic memory apparatus having device elements which can store at least a bit of binary input information. For example, in U.S. Pat. No. 3,604,988 (having an inventor in common with the present applicants), an $SI_1I_2M$ layered structure memory device is disclosed. Here, "S" denotes a semiconductor layer, "$I_1$" and "$I_2$" denote first and second insulator layers, respectively, and "M" denotes a metal electrode layer. In that type of device structure, the first insulator layer $I_1$ is located in physical contact with a major surface of the semiconductor, and the second insulator layer $I_2$ is sandwiched between the first insulator layer $I_1$ and the metal electrode. For electrical write-in of the device, negative voltage is applied to the metal electrode, so that electrons are transported by "Fowler-Nordheim" tunneling from the metal to the interface ($I_1I_2$) between the insulators, where these electrons are captured. The presence of such captured electrons at the interface thereby modifies the electrical capacitance across the $SI_1I_2M$ structure, and thus this structure affords a memory cell which can read out electrically by a simple capacitance measurement. For electrical erase of this $SI_1I_2M$ structure, a positive voltage is applied to the metal electrode, so that the captured electrons (if any) are transported back to the metal by means of Fowler-Nordheim tunneling in the opposite direction from that during the write-in. In such a memory device, the presence versus absence of captured electrons at surface states at the $I_1I_2$ interface of the insulator layers defines the memory state of the device.

Other types of $SI_1I_2M$ structures in the prior art rely upon the phenomenon of tunneling of charge carriers between the $I_1I_2$ interface and the semiconductor, rather than the metal electrode. Again, the presence versus absence of captured electrons at the $I_1I_2$ interface state defines the memory state of the device.

The above-mentioned $SI_1I_2M$ structures can be incroporated in integrated circuit arrays for mass memories, as known in the art. In such arrays, instead of measuring capacitance of a two-terminal device as previously described, each of the $I_1I_2M$ portions of many such $SI_1I_2M$ structures is advantageously fabricated as the gated of insulated gate field effect transistors (IGFET's), in which the gates are all integrated on a single semiconductor substrate. As also known in the art, these arrays can be addressed for selective write-in, readout, and erase by various selective crosspoint electrical circuit techniques, such as described for example in U.S. Pat. No. 3,665,423, issued to S. Nakanuma et al on May 23, 1972.

However, the interface states of prior art $SI_1I_2M$ structures are "naturally occuring", that is, they are not intentionally produced by any well-controlled process for introducing such states, but are formed as byproducts during the fabrication process. Consequently, these interface states tend to be rather unpredictable in their capture and discharge of electronic charge at the interface and hence erratic in their effects on device operation, as well as inefficient in the capture of electrons traveling toward the interface during the memory write-in step. Therefore, these uncontrolled interface states not only cause erratic device behavior but also necessitate the use of rather long write-in times (slow write-in speed) in the memory device. In addition, many of these interface states are further characterized by relatively large energy barrier depths within which the electronic charge carriers are captured, necessitating the use of rather long times and high voltages to empty the interface states during the erase step. Thus, undesirably large voltages and long periods of times are required for memory write-in as well as erase steps, thereby limiting the electrical programming and reprogramming speeds.

Another problem with prior art $SI_1I_2M$ memory devices arises in conjunction with the use of very thin $I_1$ layers (about 30 Angstroms or less), which are sometimes used in order to keep the applied electric fields, required for write-in or erase operation, at a sufficiently low value to prevent breakdown of the insulator (s). However, those very thin $I_1$ layer devices operate by the phenomenon of direct tunneling of electronic charge between the $I_1I_2$ interface and the semiconductor, rather than by Fowler-Nordheim tunneling; therefore, those devices tend to have only limited storage times, of the order of less than about a single year. Increasing the thickness of the $I_1$ layer, while improving the storage time, was possible only at the sacrifice of increased write-in and erase speeds, of the order of about one millisecond or more.

On the order hand, the use in semiconductor memory devices of small metal particles (or discontinuous metal layers) at the interface of two insulator layers in an $SI_1I_2M$ device, such as described in *Applied Physics Letters*, 18 (7), pp. 267–269, (1 April 1971) tends to reduce the above-mentioned problem of large energy barrier which captures the charges. This improvement comes about by reason of the fact that the small metal particles tend to reduce the energy barriers of interface states. However, these small metal particles in such devices also present the added problem of producing relatively high electrical fields in the insulator(s) in the immediate neighborhood of the metal particles. These fields tend to cause undesirable breakdown of the insulator(s) at operating voltages unless a very thin (less than about 50 Angstroms) $I_1$ insulator layer between the semiconductor and the $I_1I_2$ insulator interface is used, in order to reduce the required applied voltages and hence the electrical fields in the insulator layers. In turn, however, such a very thin $I_1$ insulator layer undesirably allows the captured electrons at the interface to tunnel directly back to the semiconductor, even when no voltages are applied, thereby limiting the electrical charge storage retention time of the memory device typically to less than the order of a single day.

Another approach in the prior art of $SI_1I_2M$ memory devices involves the use of avalanche injection for electrical write-in, rather than electrical field-assisted ("Fowler-Nordheim") or other tunneling processes as in the devices discussed above. For example, floating gate transistors as described in U.S. Pat. No. 3,660,819, issued to Frohman-Bentchkowsky on May 2, 1972, attempt to circumvent the above-mentioned problems by utilizing the phenomenon of avalanche injection of charges between the floating gate and the semiconductor substrate. However, such devices cannot be electrically erased, but are limited to thermally or optically induced discharge for erase of the memory state. Moreover, such devices suffer from degradation of the oxide insulator due to avalanching, and therefore those devices are not well suited for repeated write-ins (reprograms). It would therefore be desirable to have a semiconductor memory element which mitigates the above shortcomings of the prior art.

SUMMARY OF THE INVENTION

The semiconductor memory apparatus of this invention comprises an electrical circuit including an $SI_1I_2M$ layered structure memory device characterized in that the insulator interface ($I_1I_2$) region, containing the boundary between the insulator layers, is rich in atomically or molecularly dispersed impurity. Advantageously, particularly for ease of fabrication, this impurity is a metal selected such that it increases the capture (trapping) efficiency of electronic charge carriers (electrons or holes), particularly those charge carriers which can be transported from the semiconductor (or metal) to the $I_1I_2$ interface by the phenomenon of Fowler-Nordheim tunneling. The electric field for inducing this tunneling is provided simply by means of a voltage potential applied across the entire $SI_1I_2M$ structure. For operation with somewhat smaller voltages for the write-in, readout and erase procedures, but at some sacrifice of memory storage time of trapped electronic charge carriers at the $I_1I_2$ interface region, somewhat thinner $I_1$ layers can be used whereby the charge carriers are transported from the semiconductor to the $I_1I_2$ interface by the phenomenon of direct tunneling, rather than by Fowler-Nordheim tunneling.

In order to realize the full advantages of the invention, it is preferable that the impurity at the $I_1I_2$ interface is further characterized by a relatively low diffusion coefficient so that most of the impurity remains concentrated at the $I_1I_2$ boundary; for it is desirable in this invention that the impurity profile in the final device be sufficiently concentrated in the vicinity of the $I_1I_2$ interface so that the electrical conductance from the interface to either the semiconductor or the metal electrode is not increased, otherwise undesirable leakage current would be produced in the $SI_1I_2M$ memory device. Moreover, the surface concentration of this metallic impurity at the $I_1I_2$ interface advantageously is in the range of about $\mathbf{10^{14}}$ to $\mathbf{2\times10^{15}}$ atoms per square centimeter, which is equivalent to about 0.2 to 4.0 Angstroms thickness of pure metal as deposited on the $I_1$ layer (prior to the formation of the $I_2$ layer). By reason of this extremely small quantity of impurity used, the metallic impurity in the completed $SI_1I_2M$ structure advantageously is not by itself characterized by its own Fermi level; but instead, this small quantity of impurity is dispersed in the insulator(s) and thereby induces suitable associated energy states in the band structure of the insulator(s) at the $I_1I_2$ interface.

Although it should be understood that the scientific theory of the invention is not essential to the successful operation thereof, it is believed that the resulting $I_1I_2$ interface impurity region, which is rich in impurities concentrated at the $I_1I_2$ interface, gives rise to a clearly defined energy barrier characterized by a potential minimum ("well"), with associated "interface states" which are suitable for the capture of charge carriers. Moreover, the charge carriers captured in this potential "well" subsequently can be reversibly forced out of these $I_1I_2$ interface states back to the semiconductor (or metal) again by the phenomenon of Fowler-Nordheim tunneling, but in the reverse direction (from which the charge carriers originally tunneled to fill the interface states).

Since the presence versus absence of captured charge carriers at the $I_1I_2$ interface results in different values of capacitance of the $SI_1I_2M$ structure of this invention, this structure thus provides an electrically reprogrammable memory element which can be nondestructively read out by means of a single capacitance measurement. Alternatively, the $SI_1I_2M$ structure of this invention can be incorporated as the gate of an IGFET circuit, in which readout is accomplished by monitoring the value of source-drain current as affected by the presence of the channel inversion layer under the influence of the captured charge carriers (at the $I_1I_2$ interface) in the presence of suitable applied gate voltages.

In a specific embodiment of the invention, an $SI_1I_2M$ layered structure contains metallic tungsten impurity atoms at the $I_1I_2$ interface. Advantageously, these atoms are introduced into the $SI_1I_2M$ structure during fabrication by the deposition of tungsten onto the exposed surface of the $I_1$ layer just prior to the subsequent deposition of the $I_2$ layer and the M layer. Specifically, the semiconductor (S) is silicon, the $I_1$ layer is silicon dioxide (silica), and the $I_2$ layer is aluminum oxide (alumina). In this way, the $I_1I_2$ interface region in the completed $SI_1I_2M$ structure is rich in tungsten as an impurity which induces associated energy states in the insulator energy band structure at the $I_1I_2$ interface, and thus this $SI_1I_2M$ structure can function as a useful memory device when incorporated with suitable electrical circuitry. Write-in and erase times of as low as about 0.1 microsecond have been achieved with such an $SI_1I_2M$ structure with applied voltages of as low as about 30 volts or less for both the write-in and the erase steps.

BRIEF DESCRIPTION OF THE DRAWING

This invention, together with its features, advantages and objects, can be better understood from the following detailed description when read in conjunction with the drawings in which.

For the sake of clarity only, none of the Figures is drawn to scale.

Figure 1:
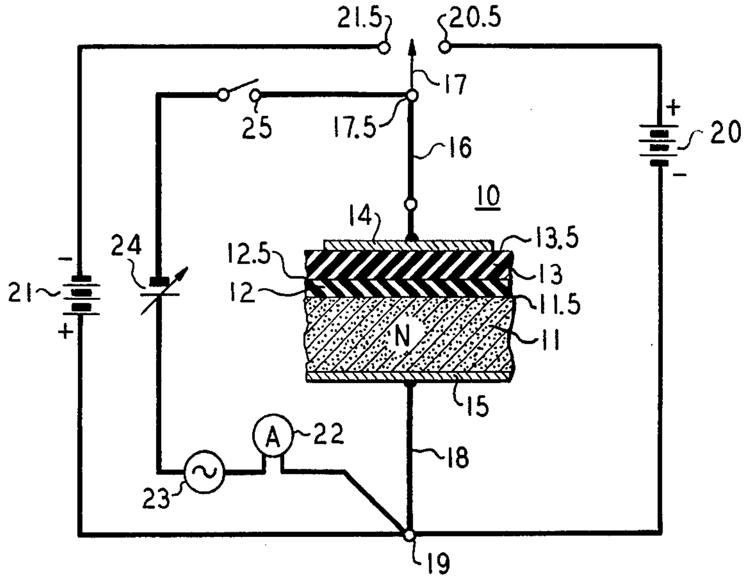
FIG. 1 is a diagram, partly in cross section, of semiconductor memory apparatus according to a specific two-terminal device embodiment of the invention.

As shown in FIG. 1, a semiconductor memory device structure 10 includes an N-type monocrystalline semiconductor body 11, typically silicon-oriented (1,1,1) or (1,0,0) and having a bulk resistivity of about 1 to 10 ohm cm, about 5 cm for example. An insulator$_1$ ($I_1$) layer 12, typically silicon dioxide, is located on a major surface of the semiconductor body 11, forming an insulator-semiconductor interface 11.5 therebetween. An insulator$_2$ ($I_2$) layer 13, typically aluminum oxide, is located on a major surface of the insulator layer 12, forming an insulator$_1$-insulator$_2$ ($I_1I_2$) interface 12.5 which is rich in an impurity, typically metallic tungsten, as more fully explained below. A metal electrode 14 is situated in physical contact with the exposed top surface 13.5 of the $I_2$ layer 13, and an electrode 15 makes physical contact with the semiconductor body 11; thus completing the $SI_1I_2M$ capacitor structure 10 serving as a memory device in the circuit shown in FIG. 1. Advantageously, the $I_2$ layer 13 is thicker than the $I_1$ layer 12, and the dielectric constant of the $I_2$ layer is greater than that of the $I_1$ layer 12; so that the electric field is greater in the $I_1$ layer than in the $I_2$ layer while the tunneling of charge carriers to (and from) the $I_1I_2$ interface 12.5 takes place substantially exclusively from (and to) the semiconductor body 11 (and not the electrode 14,) by reason of the phenomenon of Fowler-Nordheim tunneling induced by voltages applied across the electrodes 14 and 15.

To complete the circuit (FIG. 1), the electrode 14 of the structure 10 is connected by an electrically conductive wire lead 16 to the common terminal 17.5 of a single-pole double-throw electrical switch 17 having first and second contact terminals 20.5 and 21.5. The other electrode 15 of the structure 10 is connected by an electrically conductive wire lead 18 to a different common terminal 19; to which common terminal are also electrically connected the negative terminal of a (write-in) battery 20, the positive terminal of an (erase) battery 21, as well as a terminal of a current detector 22. The first terminal 20.5 of the double-throw switch 17 is electrically connected to the positive terminal of the battery 20, and the second terminal 21.5 of this switch 17 is electrically connected to the negative terminal of the battery 21. Finally, an ac signal source 23 (for capacitance readout) is connected in series with the detector 22, a field bias battery (optional) 24, and an electrical switch 25, to complete the circuit shown in FIG. 1.

In operation for write-in of the memory device structure 10, when the switch 17 is thrown into contact with the first terminal 20.5 (the switch 25 being open), the electric field in the $I_1$ layer (produced by the battery 20) causes electrons to tunnel from the semiconductor body 11 through this $I_1$ layer to the $I_1I_2$ interface 12.5. These electrons are thereby captured at this $I_1I_2$ interface, and the structure 10 is thus brought into the "write-in" state. This state persists so long as the electric field in the device 10 is not externally reversed above the threshold of reverse transport of captured electrons back to the semiconductor 11.

For erase operation, the switch 17 is thrown into contact with the second terminal 21.5, thereby connecting the battery 21 into circuit with the device 10 (the switch 25 again being open). Thereby, the electric field is reversed in the $I_1$ layer 12 above threshold for reverse transport; and therefore the previously captured electrons at the $I_1I_2$ interface 12.5 are induced to tunnel back to the semiconductor body 11, thus discharging the $I_1I_2$ interface of the previously captured electrons. This discharging of the $I_1I_2$ interface brings the structure 10 into the "erase" state.

Continuous readout of the state of captured electronic charge at the $I_1I_2$ interface 12.5 is provided by means of a conventional capacitance detection monitoring circuit, including the signal current detector 22, the signal source 23, the field bias battery 24 (optional), and the switch 25, all connected in series across the common terminal 17.5 of the switch 17 and the common terminal 19. During readout, the switch 17 is set in the open position while the switch 25 is closed. Since the capacitance of the structure 10 (under a given voltage bias of the battery 24) depends upon the state of captured electronic charges at the $I_1I_2$ interface, the signal current sensed by the detector 22 likewise depends upon the state of captured charges at this $I_1I_2$ interface. Advantageouly, the peak voltage of the signal source 23 as well as the voltage of the optional field bias battery 24 are kept sufficiently low, so that the detection process itself should not cause any further tunneling of charges in the structure 10 (which would otherwise cause spurious "write-in" or "erase"). Thereby, the detector 22 furnishes continuous nondestructive readout of the memory state, as defined by the amount of charges which are trapped at the $I_1I_2$ interface 12.5 of the structure 10.

Thus, the apparatus shown in FIG. 1, including the structure 10, provides an electrically reprogrammable memory with continuous and nondestructive readout, in which the battery 20 supplies the required write-in voltage and the battery 21 supplies the required erase voltage. Typically, the write-in voltage of the battery 20 can be as low as about 30 volts in a pulse as low as 0.1 microsecond in pulse width (i.e., closing of switch 17 to contact 20.5 for a duration of 0.1 microsecond), in conjunction with an erase voltage (battery 21) of about 30 volts likewise as a pulse of 0.1 microsecond.

It should be understood, of course, that this detection circuit as shown in FIG. 1 is only exemplary, and that other types of conventional capacitance detection circuits can alternatively be used.

In order to fabricate the structure 10, in an illustrative example, advantageously the major surface 11.5 of the silicon body 11 is initially carefully pre-cleaned as by an oxide deposition-removal procedure ("oxide stripping"). Then the silicon dioxide insulator layer 12 is grown, typically by dry thermal oxidation, on the major surface 11.5 of the silicon body 11 to a thickness of between about 60 and 200 Angstroms, typically about 100 Angstroms. Alternatively, either dry or wet anodization techniques can be used to grow this insulator layer 12 on the semiconductor body 11. Next, the then exposed surface 12.5 of the insulator layer 12 is subjected to an evaporation thereon of metallic tungsten, to the extent of a surface deposition of between about $1\times10^{14}$ and $2\times10^{15}$ atoms of tungsten per square centimeter, which is equivalent to a thickness of between about 0.2 and 4.0 Angstroms of pure tungsten. However, it should be understood that the tungsten need not persist in the finished device 10 as pure tungsten as such, particularly in view of the fact that less than about a monomolecular equivalent thickness of metallic tungsten is involved in the deposition thereof, and hence there is insufficient thickness in any dimension (with no clumping) for the tungsten to define its own (metallic) Fermi level at the $I_1I_2$ interface 12.5 in the finished device. The tungsten is thus atomically or molecularly dispersed as an impurity in the insulator layers(s) at the interface 12.5, i.e., not as bulk metal defining a Fermi level therein.

In view of the extremely small and rather well-controlled amount of tungsten to be deposited, advantageously the deposition of the tungsten onto the then exposed surface 12.5 is carried out with this surface located at a much larger distance from an evaporation source of the tungsten than a control sample surface at which a tungsten deposition is simultaneously being carried out. The inverse square law is then used to calculate and monitor the amount of tungsten being deposited on the surface 12.5, on the basis of the much greater thickness of tungsten then being deposited upon the control sample surface located much closer to the evaporation source. Alternatively, the tungsten can be introduced at the exposed surface 12.5 by mixing some tungsten halide with aluminum halide (being used for vapor deposition of the $I_2$ layer 13) advantageously during only the initial phase of an aluminum oxide deposition of the $I_2$ layer 13. In this way, the tungsten impurities are concentrated at the $I_1I_2$ interface; thereby otherwise enhanced electrical conductance by reason of impurities all the way from the metal electrode to the $I_1I_2$ interface in the final $SI_1I_2M$ structure 10 is avoided, which would cause undesired leakage current and hence reduced charge storage lifetime.

After the tungsten impurity has been thus introduced, the $I_2$ layer 13 is formed by depositing aluminum oxide to a typical thickness of between about 300 and 700 Angstroms, for example about 500 Angstroms, typically by conventional aluminum halide vapor deposition at an elevated temperature of about 900°C.

The thickness of the aluminum oxide layer 13 is not critical, but should be sufficiently thick to prevent pinholes from shorting the electrode 14 to the $I_1I_2$ interface 12.5.

The metal electrodes 14 and 15 are subsequently deposited onto the $I_2$ layer, typically by evaporating a layer of metallic aluminum thereon to a thickness of 0.2 microns.

Metallic impurities other than tungsten can be used at the $I_1I_2$ interface 12.5, such as iridium ($1\times10^{14}$ to advantageously only about $1\times10^{15}$ per $cm^2$), platinum, tantalum, or niobium, or mixtures thereof in any proportion(s). Whatever such metal impurity (or combination thereof) is selected, advantageously it should be selected in such a way that this metal impurity should not volatilize at the elevated temperature at which the $I_2$ layer is subsequently deposited. It is also important that the diffusion coefficient for the metal be sufficiently low, so that the deposited atoms of this metal should not diffuse away from the $I_1I_2$ interface, either through the $I_1$ layer to the semiconductor body 11 or through the entire thickness of the final $I_2$ layer, at said elevated temperature of $I_2$ deposition. Thus, in general, it is desirable that the final impurity profile in the insulator layers be limited such that the impurity concentration going away from the $I_1I_2$ interface falls below significant values before it reaches the $SI_1$ and the $I_2M$ interfaces.

It should be mentioned also that, instead of aluminum oxide, other insulator materials with relatively high dielectric constants (compared to the $I_1$ layer) such as silicon nitride, typically also from about 300 to 700 Angstroms thick, can likewise be used for the $I_2$ layer in the structure 10. Of course, if the phenomenon of Fowler-Nordheim tunneling between the metal electrode 14 and the $I_1I_2$ interface is to be utilized in the structure 10 (instead of between the semiconductor body 11 and the $I_1I_2$ interface), then the $I_2$ layer (rather than the $I_1$ layer) should be selected to be the thinner layer of lower dielectric constant; for example, zinc sulphide as the $I_2$ layer in combination with silicon dioxide as the $I_1$ layer on silicon semiconductor.

The diffusion constant of platinum in silicon dioxide at an elevated temperature of 900°C is believed to be of the order of $10^{-16}$ $cm^2$/sec or less. This diffusion constant corresponds to a diffusion length of about 40 to 50 Angstroms or less for a diffusion time of approximately one-half hour, which is a typical time required for the formation of the insulator$_2$ layer at that elevated temperature in the state-of-the-art chemical vapor deposition techniques. It is believed that the diffusion constants of such metallic impurities as tungsten, iridium, tantalum and niobium are likewise of the same order of magnitude as that of platinum. Therefore, it is believed that the majority of those impurities which are situated in the $I_2$ layer in the final device are confined within at most 40 or 50 Angstroms from the $I_1I_2$ interface. It is also believed that the diffusion constants in silicon dioxide of tungsten and the other metallic impurities mentioned above are approximately equal to, or less than, the corresponding diffusion constants for these impurities in aluminum oxide. Therefore, it is also believed that the majority of those impurities in the final device which are situated in the $I_1$ layer are also confined within at most 40 or 50 Angstroms from the $I_1I_2$ interface. Moreover, the vapor pressures of tungsten, platinum, iridium, tantalum and niobium at 900°C are all believed to be lower than $10^{-11}$ torr (millimeters of mercury). Therefore, it is also believed desirable that the vapor pressures of the impurities to be deposited at the $I_1I_2$ interface at 900°C should be either lower or not very much higher than $10_{-11}$ torr, so that these impurities should not evaporate away from the device during fabrication of the $I_2$ layer at the elevated temperatures required (if any) for $I_2$ layer formation. However, if elevated temperatures are not required for fabricating the $I_2$ layer, or for any subsequent steps in fabricating the device, then the above considerations for diffusion constants and vapor pressures of the impurities are obviously not applicable (except at the lower temperatures involved). In present state of art, however, such elevated temperatures are indeed required for fabricating device quality insulator$_2$ layers.

Based upon experience at higher temperatures (250°C to 350°C), a device 10 fabricated in accordance with the above techniques is reasonably expected to furnish significant memory storage at temperatures as high as 100°C for over 20 years. This expectation is based (at least in part) upon the following considerations. It is believed that the storage time of charge carriers at the $I_1I_2$ interface is limited by reason of leakage of these carriers through the $I_2$ layer. In experiments conducted with a specific example of the device 10 under an applied voltage bias of 10 volts at 250°C thereacross, of a voltage polarity which encouraged leakage through the $I_2$ layer (leakage through the $I_1$ layer being negligible), the storage time of electronic charge carriers in the device was measured as approximately 1 week. Based upon known theoretical models of electric-field enhanced conduction through the $I_2$ layer, it is expected that the storage time under zero voltage bias will be at least about 10 years at 250°C and at least 20 years at 100°C.

Figure 2:
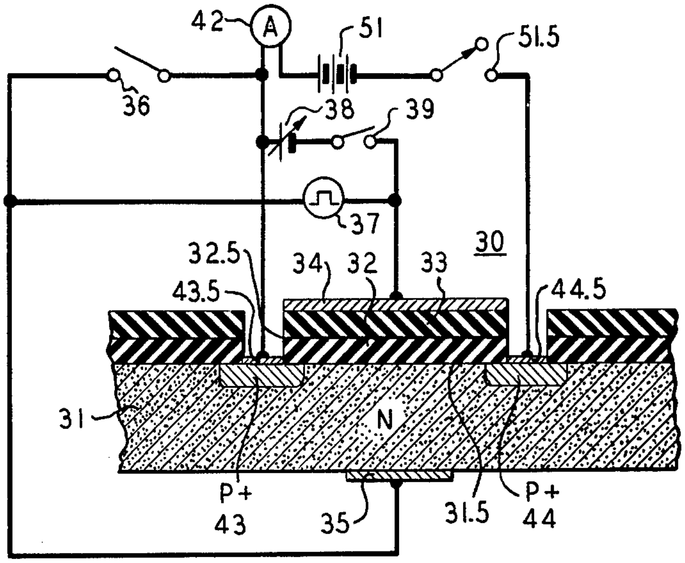
FIG. 2 is a diagram, partly in cross section, of semiconductor apparatus according to a specific three-terminal device embodiment of the invention.

FIG. 2 shows apparatus including a structure 30 which is similar to the structure 10 previously described; except that the structure 30 is incorporated in an integrated type of circuit arrangement. This structure 30 thereby forms an IGFET (insulated-gate field-effect transistor) portion of the circuit serving as a continuous readout and memory storage device. The structure 30 includes an N-type monocrystalline semiconductor wafer substrate 31, typically semiconductive silicon having a resistivity in the range of about 1 to 10 ohm centimeter, about 5 ohm centimeter for example. The substrate 31 is substantially identical to the previously described semiconductor body 11 except that the substrate 31 also includes a field-effect transistor "source" region 43 and "drain" region 44. These "source" and "drain" regions 43 and 44 are both strongly P-type ($P^+$) conductivity semiconductor, formed typically by the diffusion of acceptor impurities into the original substrate 31, as known in the art of field-effect transistors. A major surface 31.5 of the semiconductor substrate 31 is in contact with a first insulator layer 32, typically silicon dioxide, upon which is located a second insulator layer 33, typically aluminum oxide, forming an $I_1I_2$ insulator interface 32.5 therebetween. The insulator layers 32 and 33 are substantially identical to the insulator layers 12 and 13, previously described in connection with FIG. 1. An ohmic electrode contact 35 to the substrate 31, and a gate electrode 34 on the insulator layer 33, complete the IGFET structure 30.

As further illustrated in FIG. 2, a signal source 37 of information to be stored in the device 30 is connected across the gate electrode 34 and the substrate 31 through the ohmic electrode 35. The information signal source 37 advantageously provides both positive (write-in) and negative (erase) pulses of information to be stored, typically in the range of about 30 to 60 volts, the pulse widths being typically of the order of 10 microseconds each pulse. However, pulses as low as 0.1 microsecond in width can also be used. These information pulse signals are appplied by the information source 37 to the gate electrode 34 in order to write in or erase, respectively, electronic charges at the insulator interface 32.5.

In addition, a means to provide electrical connection from the information signal source 37 to the IGFET source region 43 through a switch 36 is provided in order to afford further control over the erase operation. In particular, the closure of the switch 36 during the application to the gate electrode 34 of negative (erase) pulses by the signal source 37 induces an electrically conductive channel inversion layer in the surface region of the semiconductor substrate 31 between the source region 43 and the drain region 44. Thus, the entire negative pulse voltage of the information source 37 appears as a voltage drop across the insulator layers 32 and 33, and the portion of this voltage drop across layer 32 induces the tunneling of electronic charges through this insulator layer 32. On the other hand, if and when the switch 36 is open during the erase operation while the source region 43 and drain region 44 are both negatively biased (not shown) with respect to the semiconductor substrate 31, this channel inversion layer does not form; but instead a depletion layer is formed in the surface region of the substrate 31 between source 43 and drain 44, which causes a voltage division of the negative (erase) voltage pulse across both the insulator layer 32 and 33 as well as across this depletion layer. Thereby, in particular, the electric field responsible for tunneling through the insulator layer 32 is reduced by this voltage division. Thus, the opening of the switch 36 during the erase operation, with a suitable negative pulse height supplied by the information source 37, reduces the tunneling of electronic charges through the insulator layer 32 and hence inhibits the erase effect of the negative pulses of the signal information source 37. This erase-inhibiting effect ("inhibit-erase") is particularly useful in the case of selective erase of memory elements in memory arrays formed of many IGFET structures 30 functioning as memory elements.

For readout of the memory state of the structure 30, a battery 51 and an electrical switch 51.5 are electrically connected in series with a current detector 42 across the IGFET source region 43 and the drain region 44 of the device 30. In operation, the closing of the switch 51.5 enables continuous and nondestructive readout, by the current detector 42, of the state of captured electronic charge at the interface 32.5 which is produced in response to the information pulse signal source 37. Depending upon the polarity of the immediately preceding information signal applied by the source 37 to the gate electrode 34, the interface 32.5 will be rich in, or devoid of, captured electronic charges which have tunneled between the semiconductor substrate 31 and the $I_1I_2$ interface 32.5. In the surface region of the semiconductor 31 between the source 43 and the drain 44, a relatively highly electrically conducting channel inversion layer can form, as known in the art, in response to the application of suitable gate voltage supplied by the battery 38 upon closing the electrical switch 39. This gate voltage has a threshold value for the formation of such an inversion layer, which depends upon the state of the stored electronic charge at the $I_1I_2$ interface 32.5. Thus, for readout purposes, the battery 38 is adjusted to supply a voltage bias which is sufficient to induce such a channel inversion layer in the case where the immediately preceding information pulse supplied to the gate electrode 34 by the source 37 was positive (write-in), but which is not sufficient to produce such an inversion layer in the case of a negative (erase) preceding information pulse (the battery 38 itself is not sufficient in any event to change the amount of stored electronic charge at the $I_1I_2$ interface). Thus, for readout operation, the switch 39 is closed to apply the above suitable voltage bias to the gate electrode 34, while the source-drain current is measured by the current detector 42 upon closing the switch 51.5. A relatively high current in the detector 42 is indicative of an immediately preceding positive (write-in) information pulse applied by the information source 37, whereas a relatively low such current is indicative of a negative (erase) preceding information pulse. Thereby, non-destructive and repeatable readout of the state of stored electronic charge at the $I_1I_2$ interface, and hence of the polarity of the preceding information pulse, is afforded by the apparatus shown in FIG. 2.

It should be obvious to the worker in the art that, with a reversal of polarity in the batteries 38 and 51, the conductivity type of the substrate 31 can be P type in combination with $N^+$-type source and drain regions 43 and 44 in the device 30. In such a device, "inhibit-write-in" (rather than "inhibit-erase") is obtainable by means of a positive voltage bias applied to the source and drain with respect to the substrate. In an actually constructed device of such a type, the $insulator_1$ layer 32 was a layer of silicon dioxide about 70 Angstroms in thickness, and the $insulator_2$ layer 33 was a layer of aluminum oxide about 520 Angstroms in thickness with about $1.5 \times 10^{15}$ tungsten impurity atoms per $cm^2$ at the insulator interface. For that device, the initial (erase state) threshold voltage of about one volt (for the formation of a channel inversion layer) was increased to about 6 volts by means of a write-in pulse height of about 25 volts for about 100. microsecond, or by a pulse of about 30 volts in height for about 1.0 microsecond. In the absence of the tungsten impurities, a similarly constructed device required a write-in pulse width of at least about $5 \times 10^3$ microseconds with a 30 volt pulse height for the same change in threshold.

It should be understood that various other selections of the insulator materials and the semiconductor used for the structure shown in FIG. 2 can be utilized in this invention similarly to the various selections of materials for the corresponding elements 12, 13 and 11 in the structure 10 shown in FIG. 1.

Although this invention has been described in detail in terms of a particular embodiment, various modifications can be made without departing from the scope of this invention. Devices in accordance with this invention may also be designed involving the tunneling of positively charged "holes" instead of, or in addition to, negatively charged electrons. In addition, it should also be obvious to the worker in the semiconductor art that many memory elements, each of the type described above, can be combined in a single memory storage and readout array on a single semiconductor substrate in accordance with integrated circuit techniques, as described in the aforementioned U.S. Pat. No. 3,665,423 to Nakanuma et al. Selective crosspoint write-in and readout are then easily and conveniently performed as set forth, for example, in said Nakanuma patent. Moreover, although the structure 10 has been described in detail in terms of the silicon dioxide insulator layer 12 having a thickness between about 60 and 200 Angstroms, it should be understood that at some sacrifice of storage times this insulator layer 12 can be somewhat thinner, in the range between about 15 and 50 Angstroms. In such a case it is believed that direct-tunneling phenomenon rather than Fowler-Nordheim tunneling phenomenon will take place with consequent reduction in the required operating voltages for write-in, readout and erase operations.

What is claimed is:

1. A memory apparatus which comprises a semiconductor $insulator_1$-$insulator_2$-metal layer structure, in which a first interface insulator region (including the interface of the insulator layers) contains impurities, which are dispersed, without clumping which would form a Fermi level of the impurities, in a surface concentration of between about $1 \times 10^{14}$ and $2 \times 10^{15}$ per square centimeter which supply states for the capture of electronic charges in said region, the profile of the concentration of said impurities being such that this concentration is insignificant in the insulators in a second region including the $insulator_2$-metal and in a third region including the semiconductor-$insulator_1$ interfaces.

2. Memory apparatus in accordance with claim 1 which further includes circuit means for enabling the application of electrical voltage across the structure in order to produce an electric field in the insulator layers sufficient to cause the tunneling of electronic charges for storage in the interface region.

3. Apparatus according to claim 1 in which said insulator region extends into the $insulator_2$ layer less than about 50 angstroms from the interface of the insulator layers.

4. Apparatus according to claim 3 in which the impurities are metallic impurities.

5. Apparatus according to claim 1 in which the impurities are essentially tungsten atoms.

6. Apparatus according to claim 1 in which the impurities are essentially tantalum atoms.

7. Apparatus according to claim 1 in which the impurities are essentially platinum atoms.

8. Apparatus according to claim 1 in which the impurities are essentially niobium atoms.

9. Apparatus according to claim 1 in which the impurities are essentially iridium atoms.

10. Apparatus according to claim 1 in which the impurities are essentially a mixture including tungsten, platinum, niobium, and iridium in any proportion.

11. Apparatus according to claim 1 in which the semiconductor is silicon and the $insulator_1$ layer is silicon dioxide.

12. Apparatus according to claim 11 in which the $insulator_2$ layer is silicon nitride.

13. Apparatus according to claim 11 in which the $insulator_2$ layer is aluminum oxide.

14. Memory apparatus which comprises a semiconductor $insulator_1$-$insulator_2$-metal layer structure fabricated by depositing impurities in a predetermined molecularly dispersed surface concentration of less than about $2 \times 10^{15}$ per square centimeter, without clumping which would form a Fermi level of the impurities, on the then exposed surface of the $insulator_1$ layer which is in contact with a major surface of the semiconductor, followed by fabricating the $insulator_2$ layer, such that an interface insulator region (including the interface of the insulator layers) contains said impurities in a concentration supplying suitable states for the capture of electronic charges in said region.

15. Apparatus according to claim 14 in which said surface concentration is greater than about $1 \times 10^{14}$ per square centimeter.

16. Apparatus according to claim 15 in which the impurities are metallic impurities.

17. Apparatus according to claim 14 in which the impurities are metallic impurities.

18. Memory apparatus which comprises a semiconductor $insulator_1$-$insulator_2$-metal layer structure fabricated by introducing impurities in the $insulator_2$ layer during only an initial phase of the fabrication of said $insulator_2$ layer, such that an interface insulator region (including the interface of the insulator layers but excluding the semiconductor-$insulator_1$ and the $insulator_2$-metal interfaces) contains at least the majority of said impurities and in a surface concentration, which is less than about $2 \times 10^{15}$ per $cm^2$ and which is molecularly dispersed without clumping which would form a Fermi level characteristic of the impurities, supplying suitable states for the capture of electronic charges in said region.

19. Apparatus according to claim 18 in which the said insulator region extends into the insulator$_2$ layer less than about 50 angstroms from the interface of the insulator layers.

20. Apparatus according to claim 18 in which the said impurities are metallic impurities.

21. Apparatus according to claim 20 in which the surface concentration is greater than about $1\times10^{14}$ per square centimeter.

* * * * *

UNITED STATES PATENT OFFICE

CERTIFICATE OF CORRECTION

PATENT NO. : 3,877,054

DATED : April 8, 1975

INVENTOR(S) : David M. Boulin, Dawon Kahng, Joseph R. Ligenza and William J. Sundburg It is certified that error appears in the above-identified patent and that said Letters Patent are hereby corrected as shown below:

line 62, "gated" should read --gates--.
Column 5, line 2, insert --ohm--between "5" and "cm".
Column 8, line 38, "$10-_{11}$" should read --$10^{-11}$--.

Signed and Sealed this

*sixteenth* Day of *September 1975*

[SEAL]

*Attest:*

RUTH C. MASON
*Attesting Officer*

C. MARSHALL DANN
*Commissioner of Patents and Trademarks*